C. D. WILSON.
Planters.

No. 149,698.

Patented April 14, 1874.

WITNESSES.
E. Wolff

INVENTOR.
C. D. Wilson
BY
ATTORNEYS.

UNITED STATES PATENT OFFICE.

CHARLES D. WILSON, OF KENTLAND, INDIANA.

IMPROVEMENT IN PLANTERS.

Specification forming part of Letters Patent No. 149,698, dated April 14, 1874; application filed February 14, 1874.

*To all whom it may concern:*

Figure 1:
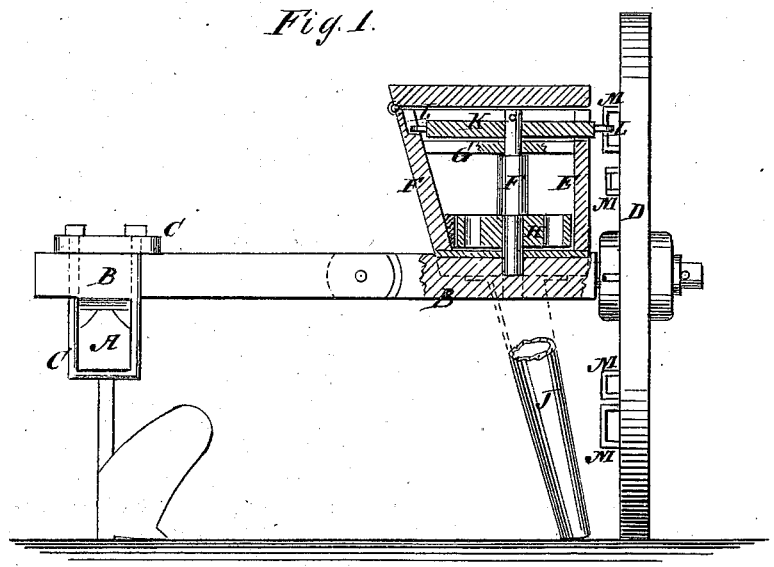
Figure 2:
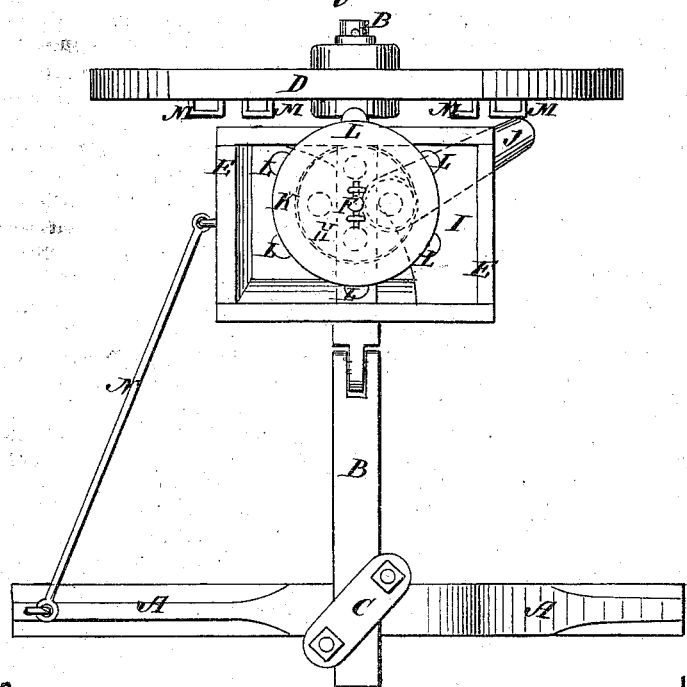

Be it known that I, CHARLES D. WILSON, of Kentland, in the county of Newton and State of Indiana, have invented a new and useful Improvement in Planters, of which the following is a specification:

Figure 1 is a rear view of my improved machine, partly in section, through the hopper. Fig. 2 is a top view of the same, the cover of the hopper being removed.

Similar letters of reference indicate corresponding parts.

The invention is an improvement in a well-known class of seed-planters; and relates chiefly to the arrangement of a toothed disk or wheel in the hopper, above the apertured seed-dropping wheel, and on the same shaft therewith, as hereinafter more fully described.

A represents the beam of an ordinary plow. B is a bar or axle, secured to the beam A in front of the plow by a bow and yoke, C, and upon the outer end of which is formed a journal, upon which revolves a wheel, D. The bar or axle B is jointed, so that the wheel D can accommodate itself to inequalities of surface, so that the planting device can be turned up and upon the beam A when not in use. To the bar B, at the inner side of the wheel D, is attached a hopper, E, to receive the seed to be planted. F is a short vertical shaft, the lower end of which revolves in a socket in the bar B, and which is kept in a vertical position by a bar, G, through a hole in which its upper part passes. To the lower part of the shaft F is attached a wheel, H, in which are formed several holes, of such a size as to contain enough seed for a hill, and by which the seed is carried beneath the cut-off block I, attached to the hopper E, and allowed to drop through a hole in the hopper-bottom into a spout, J, by which it is conducted to the ground at the outer edge of the furrow opened by the plow at the previous round, where it is covered by the furrow-slice turned by the plow. To the upper end of the shaft D is attached a wheel, K, which projects through a slot in the outer side of the hopper E. The face of the wheel K has projections or teeth L attached to it, which are struck by the projections M, attached to the wheel D, so that the seed may be dropped by the advance of the machine. The bottom of the hopper E should have two holes formed in it, one upon each side of the axle B, one of which should be closed when the other is being used, so that the device may be adjusted for a right or left hand plow, by simply changing the spout J and cut-off block I from one side to the other of the hopper E. The draft-strain upon the wheel D is sustained by the draft-rod N, the rear end of which is attached to the forward side of the hopper E or axle B, and its forward end is attached to the forward part of the beam A.

Having thus described my invention, I claim as new, and desire to secure by Letters Patent—

The seed-wheel H and the toothed disk K, mounted on opposite ends of the vertical shaft F within the hopper E, in combination with the transporting-wheel D, having projections M, which engage with the laterally-projecting edge of disk K, all as shown and described.

CHARLES D. WILSON.

Witnesses:
GEORGE C. HAWKINS,
E. LITTELL HUNSTON.